(12) United States Patent
Sidi et al.

(10) Patent No.: US 11,201,802 B2
(45) Date of Patent: Dec. 14, 2021

(54) SYSTEMS AND METHODS FOR PROVIDING INFRASTRUCTURE METRICS

(71) Applicant: W.W. GRAINGER, INC., Lake Forest, IL (US)

(72) Inventors: Colin Sidi, Crystal Lake, IL (US); Stephen S. Haskell, Beach Park, IL (US); Abhijit Naik, Oakbrook, IL (US); Deepak Rathi, Mundelein, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 316 days.

(21) Appl. No.: 13/787,124

(22) Filed: Mar. 6, 2013

(65) Prior Publication Data

US 2014/0189097 A1 Jul. 3, 2014

Related U.S. Application Data

(60) Provisional application No. 61/747,597, filed on Dec. 31, 2012.

(51) Int. Cl.
| | |
|---|---|
| *G06F 15/173* | (2006.01) |
| *H04L 12/26* | (2006.01) |
| *H04L 12/24* | (2006.01) |
| *H04L 29/08* | (2006.01) |

(52) U.S. Cl.
CPC ............ *H04L 43/08* (2013.01); *H04L 41/22* (2013.01); *H04L 43/045* (2013.01); *H04L 43/062* (2013.01); *H04L 43/065* (2013.01); *H04L 43/067* (2013.01); *H04L 67/36* (2013.01)

(58) Field of Classification Search
CPC ......... H04L 41/22; H04L 43/42; H04L 43/63; H04L 43/65; H04L 43/67; H04L 67/00; H04L 43/045; H04L 43/062; H04L 43/065; H04L 43/067; H04L 43/08; H04L 67/36
USPC .......................................................... 709/224
See application file for complete search history.

(56) References Cited

U.S. PATENT DOCUMENTS

| | | | |
|---|---|---|---|
| 6,715,084 B2* | 3/2004 | Aaron et al. ..................... 726/23 |
| 7,197,561 B1* | 3/2007 | Lovy et al. .................... 709/224 |
| 7,369,981 B1* | 5/2008 | Saghier ............... G06F 11/3409 |
| | | | 702/179 |
| 7,827,448 B1* | 11/2010 | Breslin et al. ............... 714/47.1 |
| 7,937,344 B2 | 5/2011 | Baum et al. |
| 8,112,425 B2 | 2/2012 | Baum et al. |
| 2002/0095341 A1* | 7/2002 | De Leo ............. G06Q 20/1085 |
| | | | 705/14.58 |
| 2004/0199913 A1* | 10/2004 | Perrow .......................... 718/100 |
| 2005/0091369 A1* | 4/2005 | Jones ............................ 709/224 |
| 2006/0029016 A1* | 2/2006 | Peles ..................... H04L 43/022 |
| | | | 370/328 |

(Continued)

*Primary Examiner* — Anh Nguyen
(74) *Attorney, Agent, or Firm* — Greenberg Traurig, LLP

(57) ABSTRACT

An infrastructure metrics measuring process provides relevant infrastructure metrics for components of a monitored system. The process retrieves and stores application user data for a plurality of applications running on a network system and operating system statistics for at least one operating system running at least one of the plurality of application running on a network system. The data is aggregated into at least one of a transactional data stream and a non-transactional data stream and correlated onto a common time scale. The correlated aggregated data stream is then graphically displayed to a user to further analysis by a user.

9 Claims, 9 Drawing Sheets

(56) References Cited

U.S. PATENT DOCUMENTS

2014/0019609 A1\* 1/2014 Williams et al. ............ 709/224

\* cited by examiner

SYSTEMS AND METHODS FOR PROVIDING INFRASTRUCTURE METRICS

CROSS REFERENCE TO RELATED APPLICATION

This application is a non-provisional application claiming priority from U.S. Provisional Application Ser. No. 61/747,597, filed Dec. 31, 2012, entitled "Systems and Methods for Providing Infrastructure Metrics" and incorporated herein by reference in its entirety.

FIELD OF THE DISCLOSURE

The present description relates generally to a system and method for providing fact-based application metrics for effective and efficient problem solving and more particularly to systems and methods for providing application infrastructure metrics.

BACKGROUND OF RELATED ART

Currently, it is known that the human mind can deduce, interpret, and figure out why a particular system is not functioning the way that it should. In particular, individuals correlate with their past learning experiences, filter out the non-probable causes, collect possibilities, and come up with a strategy to resolve the presented problem. However, when presented with a significant amount of data, as is typically produced by today's computer networks, the human mind can become overwhelmed in a "data overload" situation, sometimes resulting in an inability to diagnose a system level problem.

Some attempts to overcome data overload have included computer-implemented methods for organizing machine data into events. For example, in one attempt, U.S. Pat. No. 7,937,344 describes a method for providing the ability to organize and build understandings of machine data generated by a variety of information-processing environments. Machine data is a product of information-processing systems (e.g., activity logs, configuration files, messages, database records) and represents the evidence of particular events that have taken place and been recorded in raw data format. In the described system, machine data is turned into a machine data web by organizing machine data into events and then linking events together.

Still further, in another attempt, U.S. Pat. No. 8,112,425 describes a time series search engine. For instance, the described method provides the ability to organize, index, search, and present time series data based on searches. As described, time series data are sequences of time stamped records occurring in one or more usually continuous streams, representing some type of activity. Time series data is organized into discrete events with normalized time stamps and the events are indexed by time and keyword. A search is received and relevant event information is retrieved based in whole or in part on the time indexing mechanism, keyword indexing mechanism, or statistical indices calculated at the time of the search.

In each of the previous systems, however, the described methods rely on an indexing method that necessitates the building of a query every time a user needs to find a possible event and/or problem.

Thus, while the background systems and methods identified herein, generally work for their intended purpose, there is a recognized need for a computer assisted method for providing infrastructure metrics on a common time scale, provide filters, and provide data graphing techniques to visually show patterns in which a system is performing to allow a user to avoid added time/expense of determining whether a problem exists, the magnitude of the problem, and to assist in providing the user with sufficient, relevant information to diagnose and correct any problems.

BRIEF DESCRIPTION OF THE DRAWINGS

For a better understanding of the present disclosure, reference may be had to various examples shown in the attached drawings.

DETAILED DESCRIPTION

Figure 1:
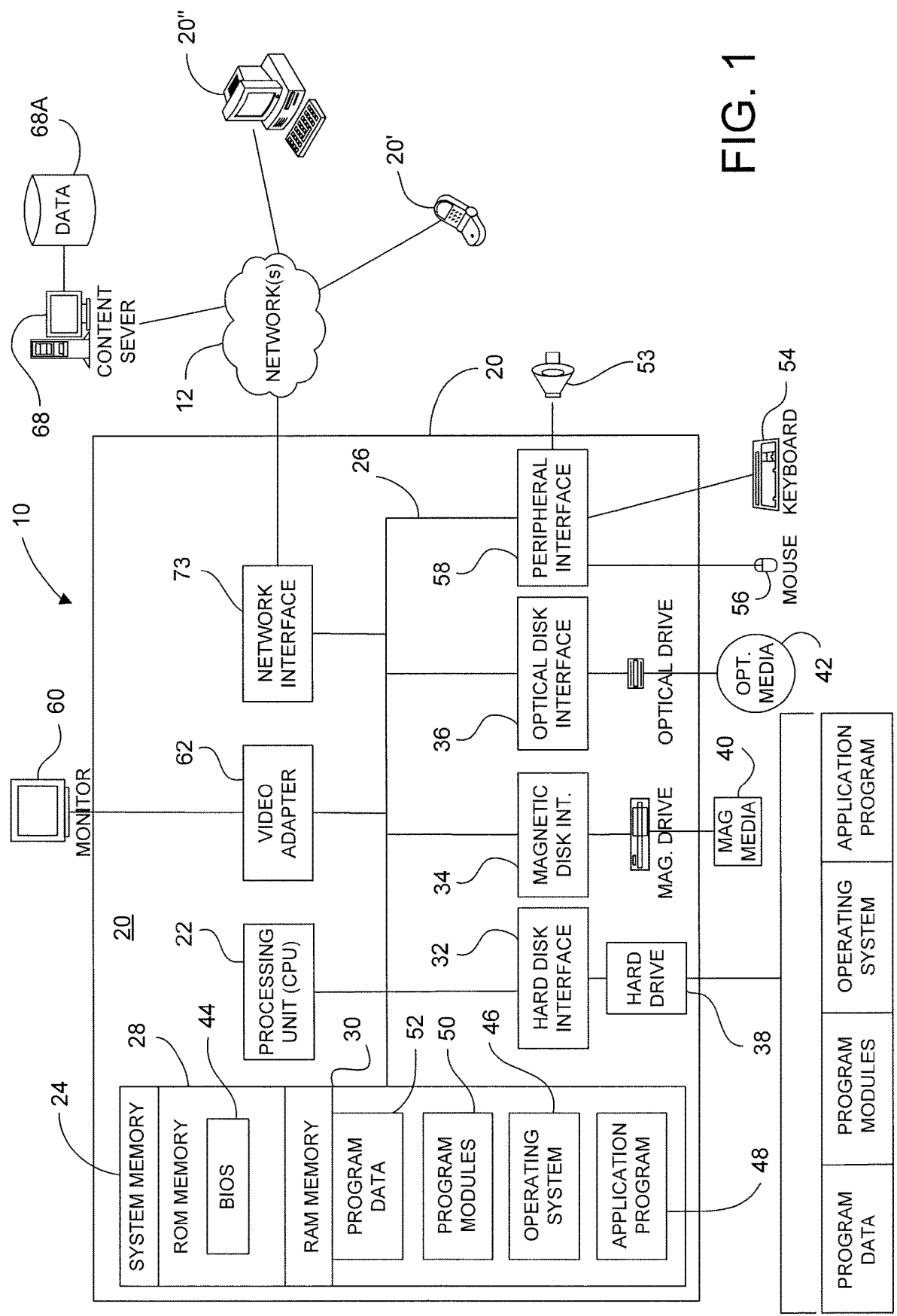
FIG. 1 illustrates in block diagram form components of an example, computer network environment suitable for implementing example infrastructure metrics systems disclosed.

The following description of example methods and apparatus is not intended to limit the scope of the description to the precise form or forms detailed herein. Instead the following description is intended to be illustrative so that others may follow its teachings.

Systems and methods for providing transaction infrastructure metrics, such as for example, providing a correlation between a user response time and infrastructure metrics on a common time scale, including for instance cross application impacts, are described herein. In general, the example methods and systems provide a means to filter a large range of possible infrastructure quantitative assessments to find a cause of an application or computer system problem. Specifically, the disclosed filters the range of possible infrastructure metrics to a few specific metrics and components to assist a user in investigation and troubleshooting in a multi-application/system environment.

In at least one example, the disclosed methods achieve the above filtering by co-relating user response time across different applications with infrastructure metrics on the same time scale an then filtering the data down to within a few seconds, to a few possible metrics and components for root cause determination. In one example, this funnel mechanism uses a five second source data sampling rate to collect accurate data points and graphically display the filtered data to a user to allow for a detailed tracking of key infrastructure metrics, early warning and trend detection and prescribing solutions to solve any identified issues. It will be recognized by one of ordinary skill in the art that the method and/or components associated with any of collecting, filtering and/or displaying the relevant metrics may be varied as desired. For example, in at least one instance, the data sampling interval may be increased or decreased as desired to provide relevant data sampling for the system involved.

The example displayed infrastructure data may be utilized for historical tracking for comparing current and past performance trends, finger print/signature-like analysis, capacity/workload planning and forecasting including system sizing, etc. Still further, limits and/or other alerts may be provided to publish information to audio, phone, email, SMS, and/or other alerts for informing command center and/or technical administration personnel as desired.

In at least one example, the disclosed methods and systems provide for a simple graphical representation of the applications and systems associated with a network that are intuitively correlated for any individual. With the present system, a user can quickly see which systems and/or application associated with a network are affected by the user performance, degradation, and/or "down" condition. Hence command center and/or technical administration personnel can respond rapidly to system and/or application failures to make sure that alerts, such as for example, emails are sent to the proper personnel, such as information technology ("IT") support owners to take action and rectify the incidence. As such, incidence response time is typically reduced, and down time is oftentimes minimized and/or averted. The present system can be provided with default and/or standard profiles and/or graphs, or may be customized as desired. The presented graphs can thus provide insight into patterns not realized by the prior art.

In general, in the presently disclosed systems and methods, data is gathered from various servers including data related to user response time to various applications and/or system events. The example systems and methods allow for various customizable configurations that provide for a at least one trackable performance indicators specific to an application operating in the system and for the graphical representation of the indicators, allowing the infrastructure metrics to be visually analyzed and adaptive to changes in a system application. In addition to tracked information such as user response time, the present disclosure provides for monitoring and display of additional transactional and non-transactional data, such as CPU usage, memory usage, disk input/output usage, network usage, server bare metal, virtual machine capacity usage, etc., which are oftentimes utilized in small chunks of data using a specialized data collector application.

Still further, the example systems and methods may include an application module that breaks the aggregated raw data into a number of different data streams, including for example, a temporary data stream, and a raw data log. The multitude of streams may provide redundancy and/or allow for analysis for further problem detection as desired. The raw data log may then be bifurcated (or further divided) into additional sub-categories of data including, for instance, non-transactional data and transactional data as each type of data may be indicative of distinct system diagnosis. Then utilizing predetermined and/or customizable filters and algorithms to correlate data which is again aggregated to provide different views and alerts to different applications and system users as will be described hereinbelow.

In still further examples, with the aggregated data there may be an early warning system that is used by appropriate personnel (e.g., command center personnel). In the present disclosure, the early warning system may provide alerts, such as audio, visual, text, etc. when a particular system achieves a predefined and/or calculated severity status. In these manner, users of the present infrastructure monitoring systems and methods may rely upon the early warning system to identify, alert, and respond to a problem prior to and/or quickly after the issue reaches its full magnitude across different effected applications and/systems on the network.

It will be appreciated by one of ordinary skill in the art that there are numerous data aggregation and/or display techniques that may be provided to assist the appropriate user in providing an effective and efficient diagnosis response, providing stable system and/or network operations, reduce the cost of operations, improve intrusion detection, provide portable data access, and the like.

With reference to the figures, and more particularly, with reference to FIG. 1, the following discloses various example systems and methods for providing infrastructure metrics regarding a computer network, such as a personal computer or mobile device network. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a system administrator, customer, user, client, corporate shopper, buyer, consumer, etc., to access a host system server 68 and, among other things, be connected to various network applications including, for example, network internal applications and network external applications, e.g., an application server, a website, mobile applications, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a local and/or network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices (e.g., servers, etc.), such as the host system server 68 having at least one associated data repository 68A. The example data repository 68A may include suitable analytical data and/or data structures suitable for storing and retrieving such data, and may further include vendor data including, for example, customer/company information, electronic catalog pages, inventor, etc. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, facilitating the retrieval, aggregation, storing, and processing of analytic and/or infrastructure metrics data, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
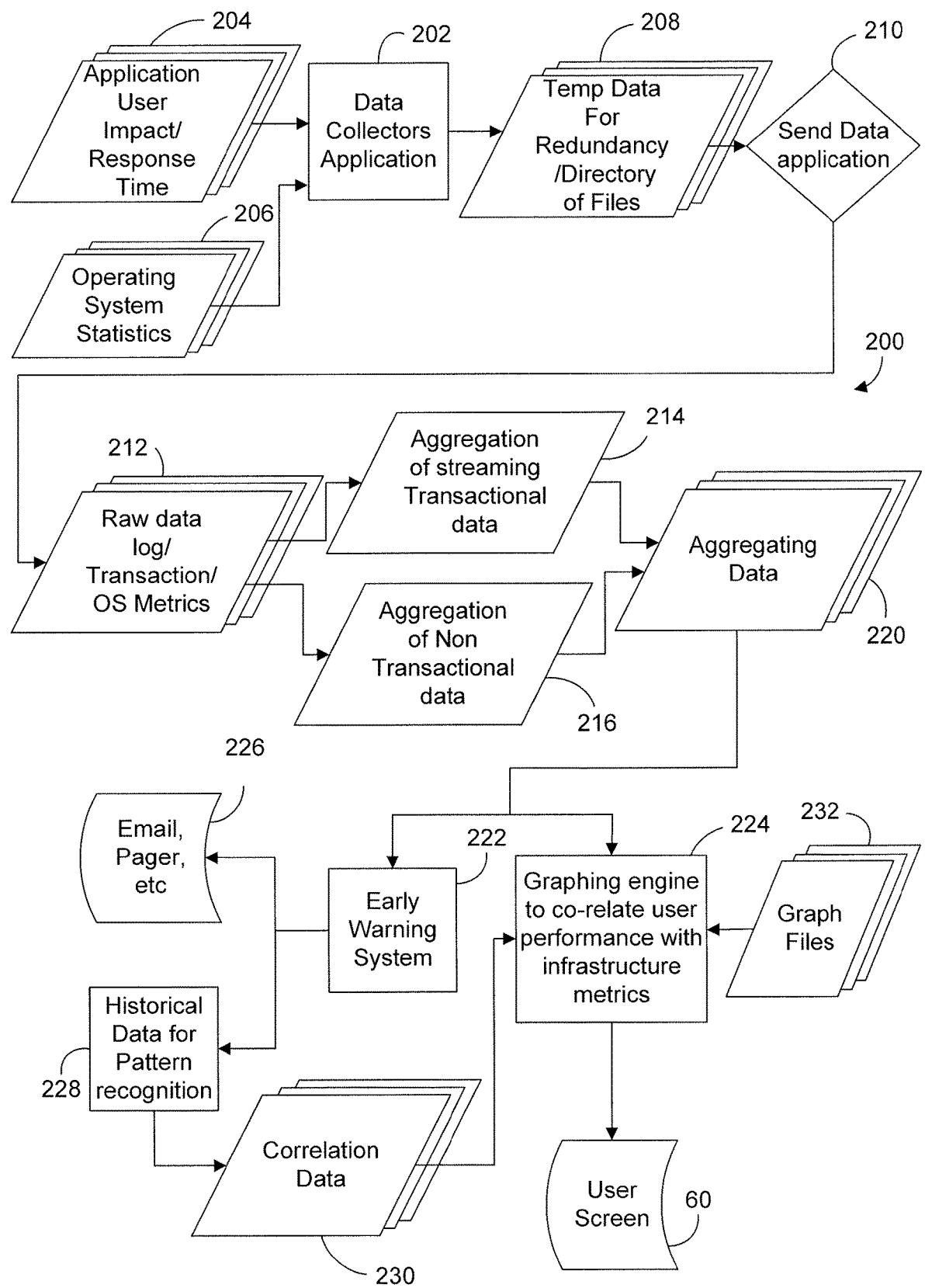
FIG. 2 illustrates an example process flow diagram of the example transactional and non-transactional infrastructure metrics systems disclosed herein.

As disclosed, in the present example, a user generally interacts with the host system server 68 to monitor and/or identify and correct issues with any portion of the network 12. To facilitate this, the host system server 68 provides access to a process aggregating, monitoring, and displaying infrastructure metrics on the client computing device. More particularly, as illustrated in an example process 200 in FIG. 2, the host system server 68 provides a user, such as for example, a system administrator, access to a graphical user interface that allows for display of relevant infrastructure statistics. In the illustrated process 200 of FIG. 2, to provide a data collection step 202, the process 200 is configured to aggregate data regarding application user impact, such as for example response time 204, at block 204, and configured to aggregate data regarding operating system statistics at block 206.

It will be appreciated by one of ordinary skill in the art that the user impact data 204 may be any suitable impact data, including, for example, individual application response times, network response times, etc. Additionally, the user impact data 204 may be accumulated for individual users, servers, networks, etc. as desired, or may be further aggregated in to groups of computing devices as desired. Still further, as previously noted, the operating system statistics may be any suitable statistically collectable data including, for instance, CPU load, memory load, network packets, etc., relevant to individual machines and/or groups of machines as desired.

To provide for data redundancy, the process 200 may, in concert with the aggregation of data in block 202, store the collected data in, for example, the data repository 68A and/or any other suitable data repository and/or file system in block 208. The data may be stored for temporary purposes (e.g., temporary redundancy) or may be stored for a period of time to ensure data history availability. It will be further understood by one of ordinary skill in the art that the data stored in the block 208 may be semi-permanently or alternatively permanently stored, and further may be alternatively stored based upon any number of identified criteria as desired. For example, it may be such that the process 200 is configured to store the aggregated data for a semi-permanent (i.e. temporary) time frame, but configured to permanently stored the data in case of a triggering event, such as the loss of a network device, server, computer, application, etc. to preserve data as necessary for recall and/or recreation.

Once the data is stored in the block 208, at a block 208, the process 200 sends the aggregated data to a raw data log 212 for further processing. Similar to the temporary data in the block 208, the raw data log, composed, in this example of an aggregation of user impact data, transaction data, and operating system metrics, may be stored or simply processed as desired. To further process the raw data log 212, the example process 200 bifurcates the raw data into two data streams including a transactional data stream 214 and a non-transactional data stream 216. It will be understood that the raw data log 212 may be processed with any suitable processing design. For example, in systems where the raw data is sufficiently small and/or the processing power of the system sufficiently large, the raw data log 212 may be processed as a single data stream or as a number of small streams, while in still other examples, the raw data log 212 may be divided into any number of data streams as desired. Additionally, the sorting mechanism utilized in dividing any data stream, where applicable, may be determined by any suitable means.

To further process the input data streams 214, 216, the process 200 utilizes a data aggregation algorithm at a block 220. In one instance, the example data aggregation algorithm(s) provides specialized filter(s) and/or algorithm(s) to sort, filter, correlate, process, detect anomalies, and/or provide different views into the data. Once aggregated at the block 220, the process 220 passes the example aggregation data to an early warning system at block 222 and a graphing engine at a block 224.

The example early warning system at the block 222 is primarily used by command center personnel. For instance, in this example, the early warning system analyzes the aggregated data against at least one threshold (e.g. predefined, historic, adaptive, etc.) as will be understood by one of ordinary skill in the art. In this example, the early warning system provides an audio or other suitable alert (e.g., email, pager, SMS, etc.) at a block 226 when a particular system goes to a predefined severity status, such as, for instance, when an application or system on the network 12 goes down. The early warning system allows a system administrator to identify, alert, and/or respond to a problem prior to it reaching its full magnitude across different applications and systems.

The example early warning system in the process 200 also supplies relevant data to a block 228 for historical storage purposes at block 230, such as for example, for pattern recognition purposes. Once the early warning system has been utilized, process control passes back to the block 224, where a graphing engine utilizes at least one graph file 232 to display performance and infrastructure metrics on the display 60. From here, the user can utilize the displayed graphical data to conduct system analysis as previously described.

Figure 3:
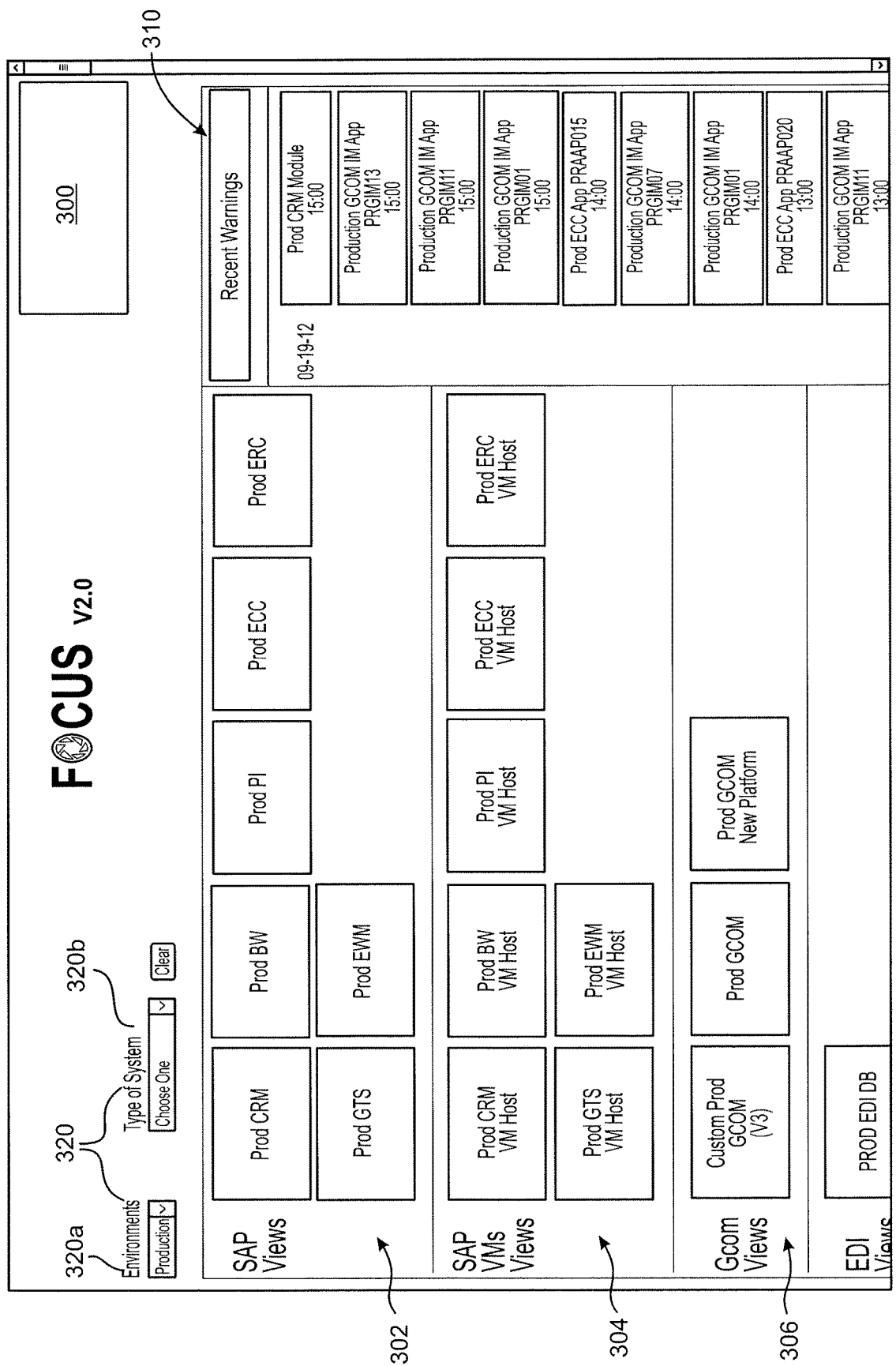
FIG. 3 illustrates an example page that provides a summary of monitored components in the example infrastructures metrics process of FIG. 2.

Turning to FIG. 3, there is illustrated a sample webpage 300 that provide a user with a summary view of the overall operation of the network 12, and is the result of the process 200. In this example, the webpage 300 displays a color coded summary providing the user with a quick view into the status of the monitored system. For instance, in this example, the webpage 300 provides a quick summary view of a group of production servers 302, a group of production virtual machines 304, a group of Internet websites 306, etc. In this example, the color coded website 300 includes at least three colors, green indicating that the operations are normal, yellow, indicating that operations are currently and/or predictively subject to an issue, and red, indicating that the identified system is subject to an issue. The webpage 300 also includes an area 310 that displays previous and/or current warnings.

It will be further appreciated that each of the areas 302, 304, 306, 310, etc. on the webpage 300 may be selected, filtered, and/or otherwise displayed, such as for example, by utilizing selection filters 320. For instance, in this example, a first filter 320a includes a drop-down box allowing the user to select the type of environment being monitored (e.g., production, testing, etc.). Similarly, the example filter 320 includes a second filter 320b including a selectable drop-down box for choosing the type of system being monitored.

Figure 4:
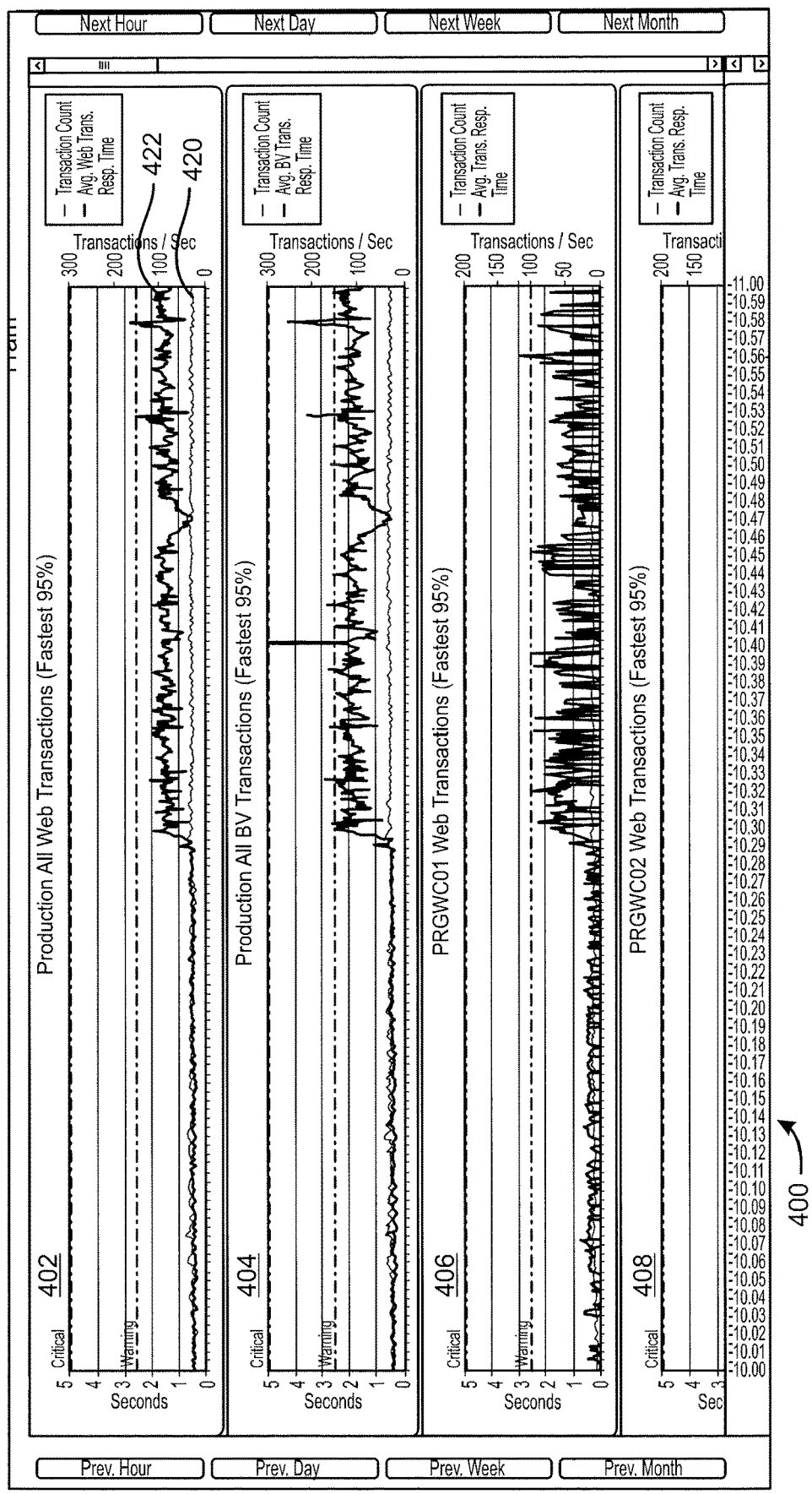
FIG. 4 illustrates an example page that provides additional graphical information on a common time-scale regarding at least one monitored component of the example system.

An example webpage 400 to provide a graphical display of the monitored and aggregated infrastructure metrics is illustrated in FIG. 4. As illustrated in this example, the process 200 displays a plurality of graphs 402, 404, 406, and 408 that are time correlated to assist the user in graphically identifying the relevant infrastructure data. More particularly, in this example, the graph 402 displays information regarding the number of transactions against a production webpage (plot 420), and the average response time for each transaction (plot 422). By providing the relevant data, a user can quickly and visually identify abnormal operation conditions and quickly identify the relevant cause.

Figure 5:
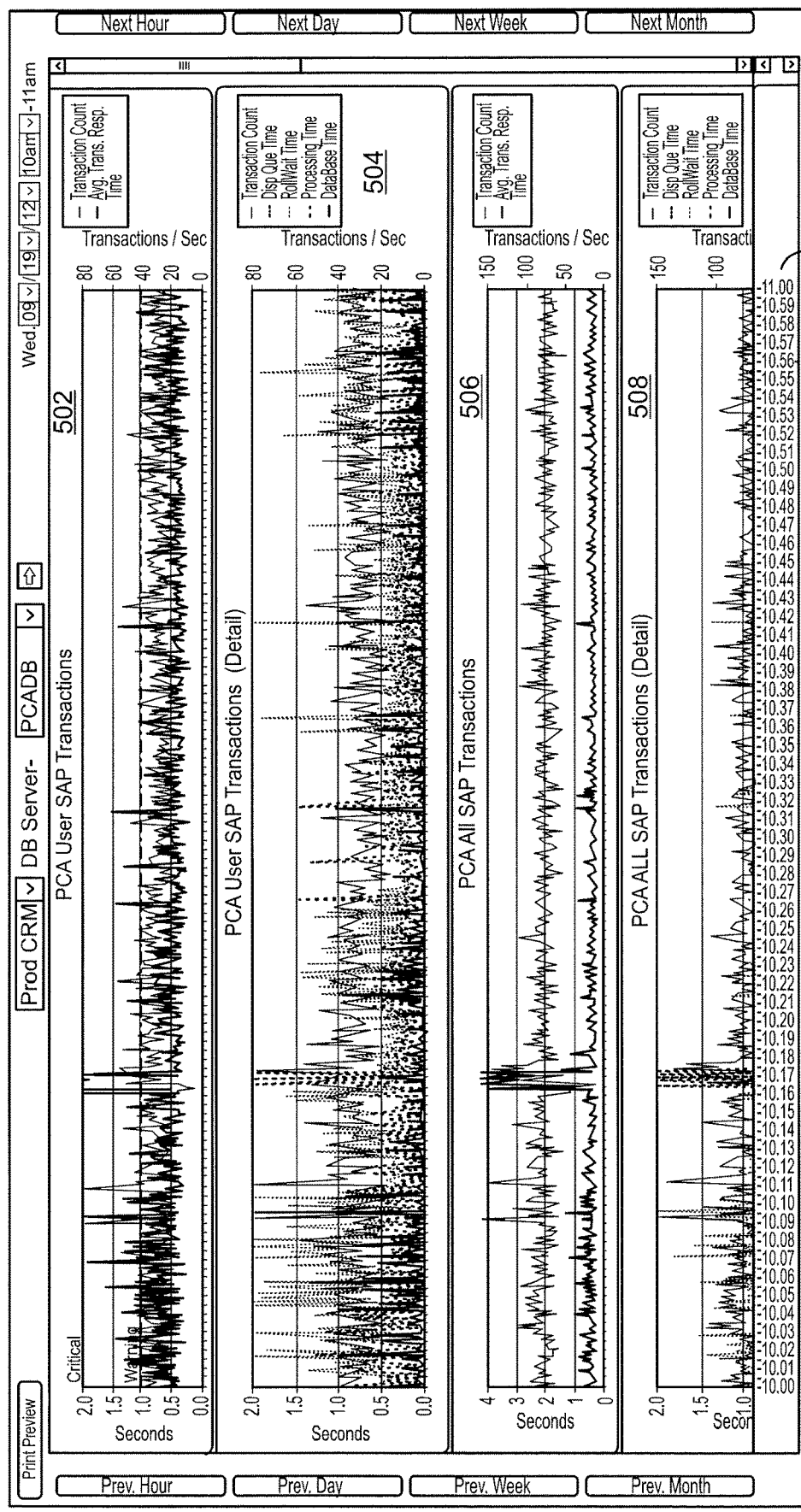
FIG. 5 illustrates another example page that provides additional graphical information on a common time-scale regarding at least one monitored component of the example system.

Another example webpage 500 to provide analytical data to a user is illustrated in FIG. 5. As with the previous illustrations, the example webpage 500 displays a plurality of graphs 502, 504, 506, and 508 on a common time scale 510. In this example, user response time is once again co-related to infrastructure metrics based on common time scale, and includes cross application impacts to provide an easy to view impact display. It will be appreciated by one of ordinary skill in the art that the example graphs can provide real-time or near real-time visibility (e.g., within 1-2 minutes), or as in this example, provide historical performance for pattern searching and recognition.

Figure 6:
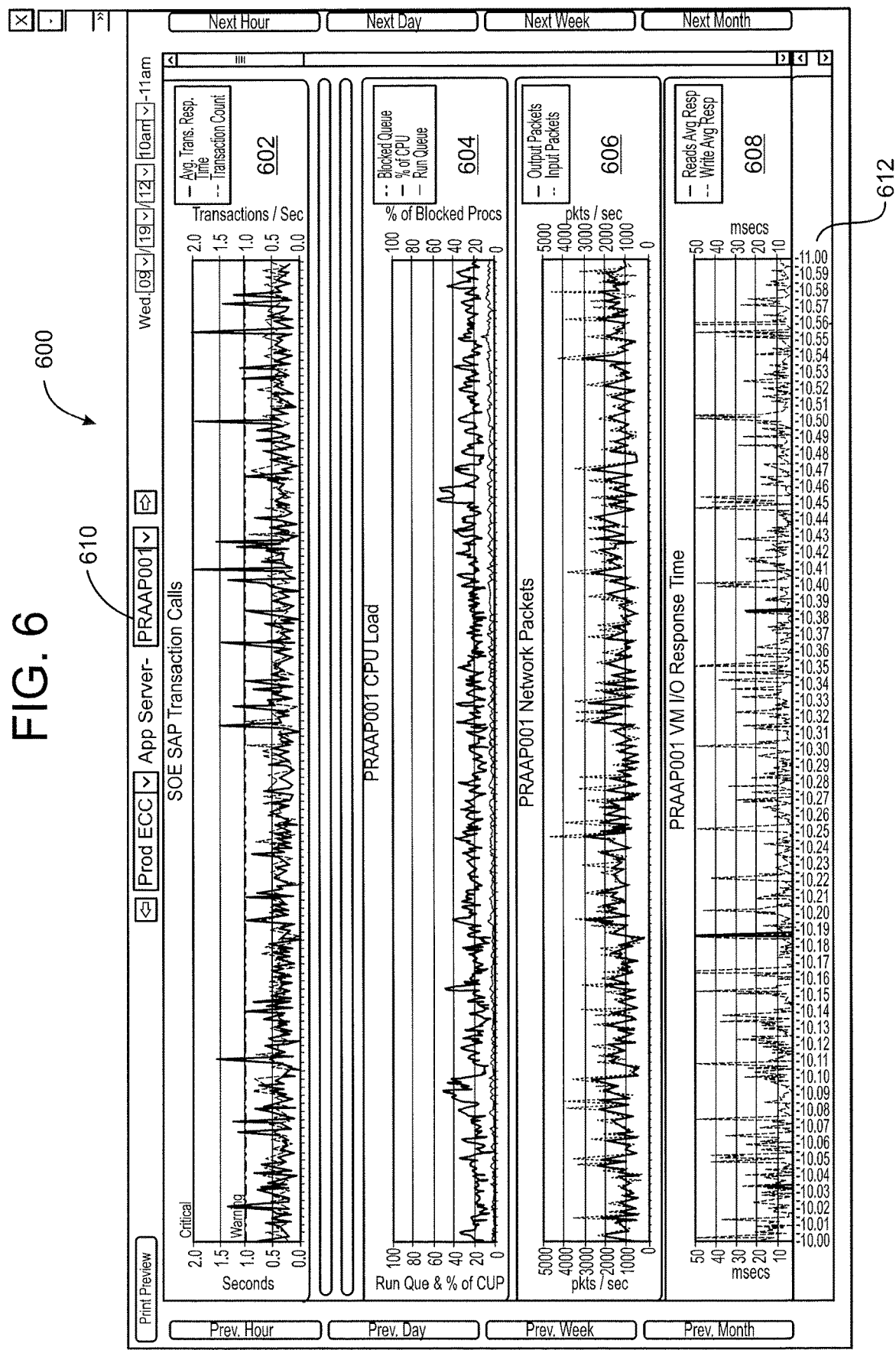
FIG. 6 illustrates another example page that provides yet additional graphical information on a common time-scale regarding at least one monitored component of the example system.

Turning to FIGS. 6-9, additional example displays are illustrated. Specifically, FIG. 6 illustrates an example webpage 600 that provides for an application performance view. In this example, the displayed graphs provide information regarding specific transactions calls 602, CPU load 604, network packets 606, and virtual machine response time 608 for a specific server 610 (i.e. "PRAAP001") on a common timescale 612.

Figure 7:
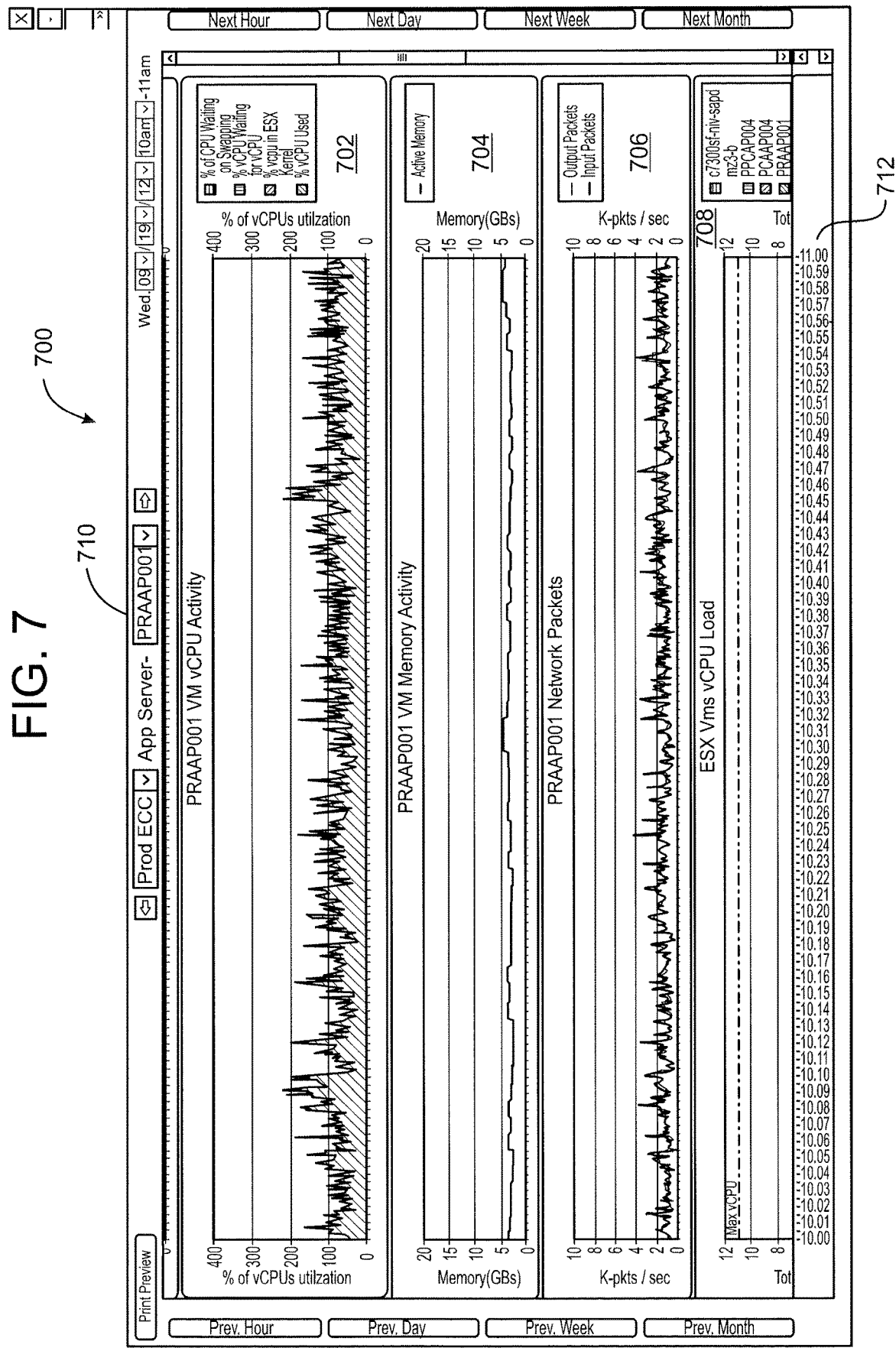
FIG. 7 illustrates another example page that provides still additional graphical information on a common time-scale regarding at least one monitored component of the example system.

FIG. 7 meanwhile illustrates a webpage 700 that shows virtual machine performance on a specific app server 710 (i.e. "PRAAP001"). In this example, the displayed graphs provide information regarding virtual machine versus CPU activity 702, virtual machine memory activity 704, network packets 706, and virtual machine versus CPU load 708 on a common time scale 712.

Figure 8:
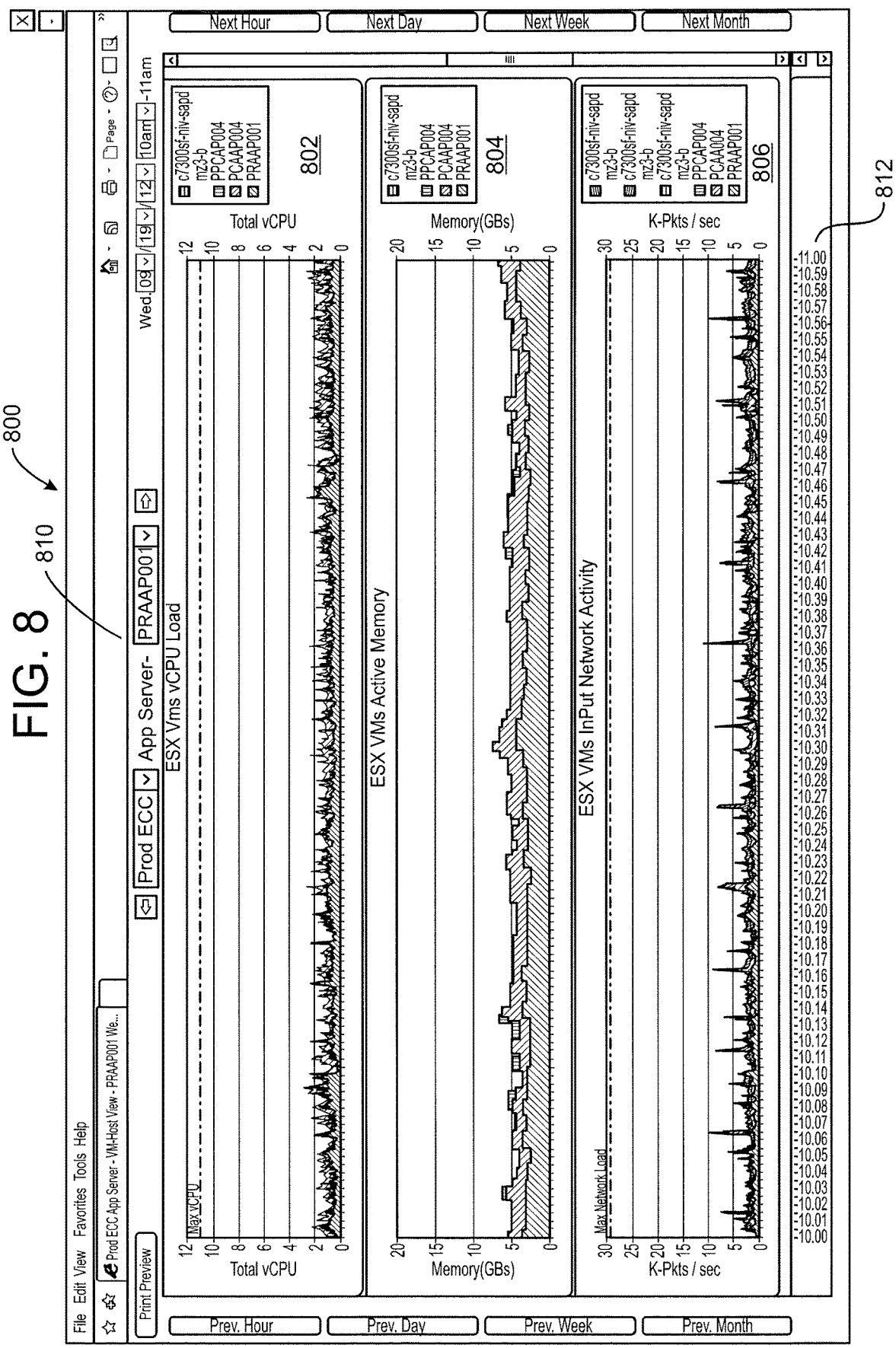
FIG. 8 illustrates yet another example page that provides additional graphical information on a common time-scale regarding at least one monitored component of the example system.

Turning to FIG. 8, there is illustrated a webpage 800 that shows the performance of multiple virtual machine on the same physical machine 810 (i.e., "PRAAP001"). For instance, in this example, the webpage 800 illustrates a graph of virtual machines versus CPU Load 802, virtual machine active memory 804, and virtual machine network activity 806 on a common time scale 812.

Figure 9:
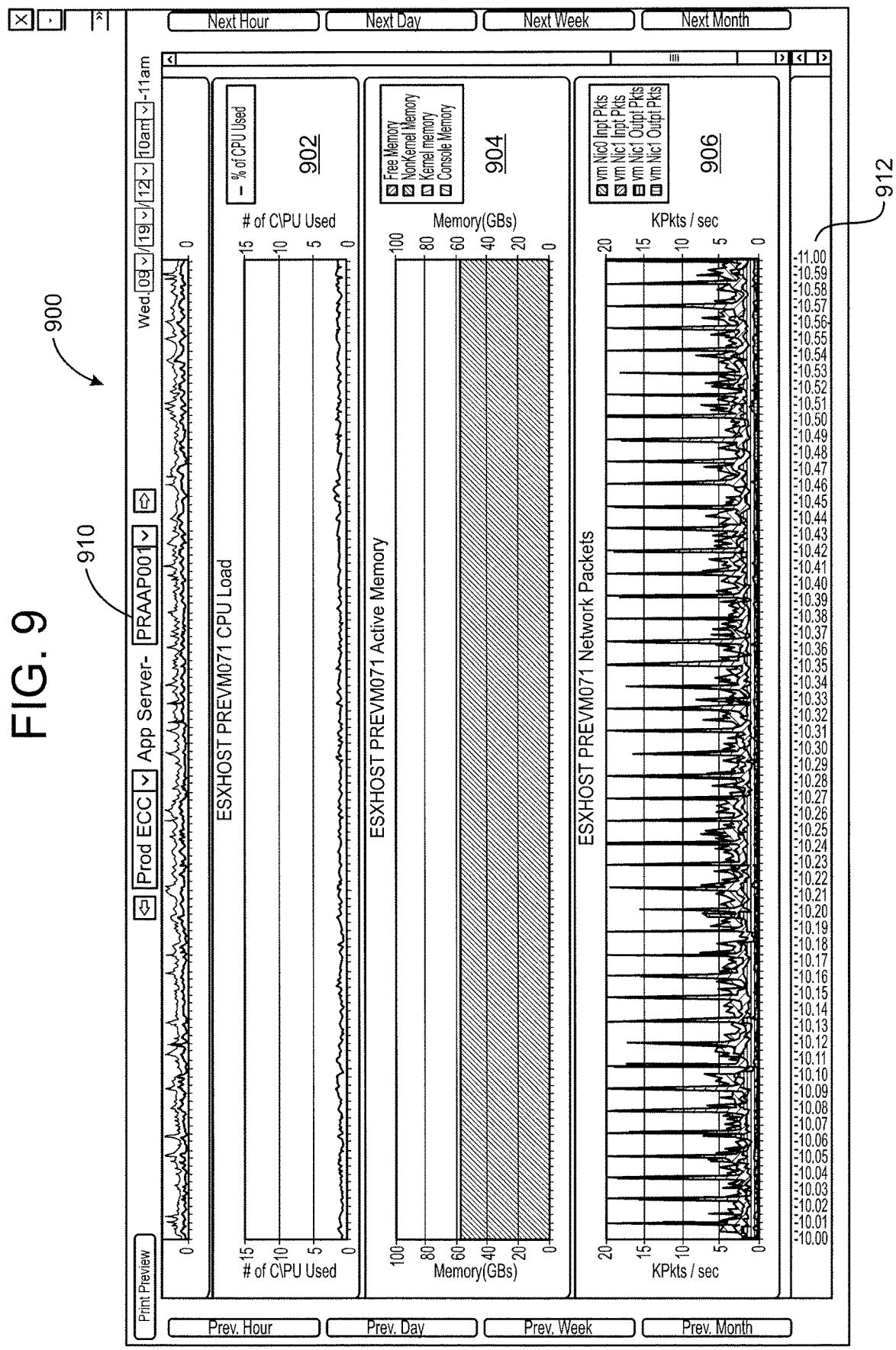
FIG. 9 illustrates another example page that provides additional graphical information on a common time-scale regarding at least one monitored component of the example system.

Finally, FIG. 9 illustrates an example webpage 900 showing physical machine performance for a specific application server 910 (i.e., "PRAAP001"). Specifically, the example webpage 900 displays graphical information regarding CPU Load 902, active memory 904, and network packets 906 on a common time scale 912.

With the previous example, network, application, machine, system and/or other problems are made visible in real-time or near real-time quantifying the impact to the customer. In this manner, there can typically be no real argument around if the problem exists, its magnitude, its duration, and/or where the problem lies, as the evidence is graphically available to the end user for further analysis. As such, in one feature of the present disclosure, countless hours of problem detection and isolation can potentially be eliminated, and thus an organization's network management functioning can ultimately be made more efficient.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transient, computer readable media having stored thereon instructions for providing infrastructure metrics for network system comprised of a plurality of network components wherein the instructions, when executed by a computing device, cause the computing device to perform steps comprising:
    obtaining data indicative of individual application response times resulting from individual user interactions with each of a plurality of applications running on the network system;
    obtaining data indicative of operating system usage of system resources for each operating system running a respective one or more of the plurality of applications running on the network system;
    bifurcating at least the data indicative of individual application response times resulting from individual user interactions with each of the plurality of applications running on the network system into one or more sequences of transactional data and one or more sequences of non-transactional data;
    correlating at least one of the one or more sequences of transactional data and the one or more sequences of non-transactional data together with the data indicative of operating system usage of system resources for each operating system running the respective one or more of the plurality of applications running on the network system; and
    using a common time scale to display on a display in a graphical format the correlated at least one of the one or more sequences of transactional data and the one or more sequences of non-transactional data and the data indicative of operating system usage of system resources for each operating system running the respective one or more of the plurality of applications running on the network system.

2. The non-transient, computer-readable media as recited in claim 1, wherein the instructions, when executed by the device, cause the device to temporarily store the data indicative of individual application response times resulting from individual user interactions with each of the plurality of applications running on the network system and the data indicative of operating system usage of system resources for each operating system running the respective one or more of the plurality of applications running on the network system in a memory device for redundancy.

3. The non-transient, computer-readable media as recited in claim 1, wherein the instructions, when executed by the device, cause the device to determine when the at least one of the one or more sequences of transactional data and the one or more sequences of non-transactional data as correlated together with the data indicative of operating system usage of system resources for each operating system running the respective one or more of the plurality of applications running on the network system indicate at least one of a current or future anomaly.

4. The non-transient, computer-readable media as recited in claim 3, wherein the instructions, when executed by the device, cause the device to provide an alert to a user regarding the detected anomaly.

5. The non-transient, computer-readable media as recited in claim 4, wherein the alert process comprises at least one of an email alert, an audio alert, a visual alert, a pager alert, or a messaging alert.

6. The non-transient, computer-readable media as recited in claim 1, wherein the graphical format displayed comprises a summary regarding each of the plurality of components of the network system.

7. The non-transient, computer-readable media as recited in claim 6, wherein the summary is color-coded to reflect the current operating condition of each of the plurality of components of the network system.

8. The non-transient, computer-readable media as recited in claim 6, wherein the instructions, when executed by the device, cause the device to respond to a selection of a summary regarding one of the plurality of components of the network system by causing additional graphical information on the common time scale regarding the selected one the plurality of components of the network system to be displayed.

9. The non-transient, computer-readable media as recited in claim 8, wherein the additional graphical information is filterable.

* * * * *